United States Patent
Park et al.

(10) Patent No.: US 12,412,495 B2
(45) Date of Patent: Sep. 9, 2025

(54) IMAGE PROCESSING DEVICE, OPERATING METHOD THEREOF, AND DISPLAY SYSTEM INCLUDING IMAGE PROCESSING DEVICE

(71) Applicant: Samsung Electronics Co., Ltd., Suwon-si (KR)

(72) Inventors: Deoksoo Park, Suwon-si (KR); Seungwan Kim, Suwon-si (KR); Yongkwon Cho, Suwon-si (KR); Byoungju Song, Suwon-si (KR); Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 18/372,350

(22) Filed: Sep. 25, 2023

(65) Prior Publication Data

US 2024/0112606 A1   Apr. 4, 2024

(30) Foreign Application Priority Data

Sep. 30, 2022   (KR) ........................ 10-2022-0125815

(51) Int. Cl.
  *G09G 3/00* (2006.01)
  *G06T 5/00* (2024.01)
  *G06T 5/50* (2006.01)

(52) U.S. Cl.
  CPC .............. *G09G 3/03* (2020.08); *G06T 5/00* (2013.01); *G06T 5/50* (2013.01); *G09G 2320/02* (2013.01); *G09G 2340/10* (2013.01)

(58) Field of Classification Search
  None
  See application file for complete search history.

(56) References Cited

U.S. PATENT DOCUMENTS 9,672,603 B2 * 6/2017 Koike ................. G06T 5/90
10,482,844 B2 * 11/2019 Lin .................... G09G 5/10
(Continued)

FOREIGN PATENT DOCUMENTS

| EP | 3 454 322 A1 | 3/2019 |
| KR | 10-2019-0048649 A | 5/2019 |
| KR | 10-2021-0063412 A | 6/2021 |

OTHER PUBLICATIONS

Communication issued on Feb. 27, 2024 by the European Patent Office in European Patent Application No. 23199659.6.

*Primary Examiner* — Vinh T Lam
(74) *Attorney, Agent, or Firm* — Sughrue Mion, PLLC

(57) ABSTRACT

An image processing device is provided. The image processing device includes: an image quality enhancement circuit configured to generate second image data indicating a plurality of pixel values corresponding to a quadrangular shape by performing image quality enhancement processing on first image data; a map decoder configured to read a map, which includes a plurality of pixel adjustment values for adjusting brightness of a first region of the second image data corresponding to a curved edge of a display panel, from a memory and provide alpha values indicated by the map; a processing circuit configured to generate third image data by adjusting the brightness of the first region by applying the alpha values to the second image data; and a transmission circuit configured to output the third image data to a display driving integrated circuit.

20 Claims, 21 Drawing Sheets

(56) References Cited

U.S. PATENT DOCUMENTS

| | | |
|---|---|---|
| 10,503,280 B2 | 12/2019 | Yoo et al. |
| 10,706,814 B2 | 7/2020 | Li et al. |
| 11,140,250 B2 * | 10/2021 | Li .................... H10K 59/40 |
| 11,308,868 B2 | 4/2022 | Stan et al. |
| 11,501,721 B2 * | 11/2022 | Yum .................... G09G 3/3291 |
| 11,689,825 B2 * | 6/2023 | Jeong .................... H04N 23/81 |
| | | 348/222.1 |
| 11,694,617 B2 * | 7/2023 | Yoon .................... G09G 3/3233 |
| | | 345/77 |
| 11,961,448 B2 * | 4/2024 | Kim .................... G09G 3/2092 |
| 2005/0036175 A1 * | 2/2005 | Klatchko .......... G06K 15/1872 |
| | | 382/199 |
| 2009/0195481 A1 * | 8/2009 | Taguchi .................... G02B 5/205 |
| | | 345/55 |
| 2009/0309813 A1 * | 12/2009 | Fujita .................... G09G 3/3611 |
| | | 345/55 |
| 2017/0372675 A1 * | 12/2017 | Cho .................... G09G 5/005 |
| 2018/0063466 A1 | 3/2018 | Bae et al. |
| 2020/0251041 A1 | 8/2020 | Peng et al. |
| 2021/0134221 A1 | 5/2021 | Berget et al. |

* cited by examiner

FIG. 4

| Region | Alpha Value | Mixed Value |
|---|---|---|
| Background | 0 | User Set (default=0, 0, 0) |
| Aliasing | Various | User Set (default=0, 0, 0) |
| Contents | 255 | Not Available |

FIG. 7

| Index | Prefix | | | | | Suffix |
|---|---|---|---|---|---|---|
| | Unit Property (3-bits) | | | # of pixels (5 or 13 bits) | Prefix size | Alpha value (optional) |
| | Region | # of pixels | alpha same | | | |
| 0 | Aliasing | < 32 | O | 5 | 1-byte | 1-byte per pixel alpha |
| 1 | Aliasing | < 32 | X | 5 | 1-byte | 3-byte per pixel alpha |
| 2 | Aliasing | ≥ 32 | O | 13 | 2-byte | 1-byte per pixel alpha |
| 3 | Aliasing | ≥ 32 | X | 13 | 2-byte | 3-byte per pixel alpha |
| 4 | Background | Don't care | Don't care | 13 | 2-byte | None |
| 5 | Contents | Don't care | Don't care | 13 | 2-byte | None |
| 6 | UnCompressed | Don't care | Don't care | 13 | 2-byte | 3-byte per pixel alpha |
| 7 | Reserved | | | | | |

IMAGE PROCESSING DEVICE, OPERATING METHOD THEREOF, AND DISPLAY SYSTEM INCLUDING IMAGE PROCESSING DEVICE

CROSS-REFERENCE TO RELATED APPLICATION

This application is based on and claims priority to Korean Patent Application No. 10-2022-0125815, filed on Sep. 30, 2022, in the Korean Intellectual Property Office, the disclosure of which is incorporated by reference herein in its entirety.

BACKGROUND

The present disclosure relates to a semiconductor device, and more particularly, to an image processing device for providing image data to a display driving integrated circuit that drives a display panel, an operating method of the image processing device, and a display system including the image processing device.

An electronic device having an image display function, such as a computer, a tablet personal computer (PC), a smartphone, and a wearable electronic device, includes a display system. The display system includes a display panel and an image processing device, such as a display driving integrated circuit (DDI) a display driver or an application processor. The display panel may include a plurality of pixels and may be implemented as a flat panel display, such as a liquid crystal display (LCD) or an organic light emitting diode (OLED), or a flexible display. As electronic devices to which display systems are applied diversify, shapes of display panels diversify and may include round corners or pinhole regions. Round corner display (RCD) processing may be performed, on image data to be displayed on the display panel, for natural display of curves in round corners, pinhole regions, or regions around pinholes.

SUMMARY

Example embodiments provide an image processing device for generating image data for display on a curved region of a display panel with a natural appearance, an operating method of the image processing device, and a display system including the image processing device.

According to an aspect of an example embodiment, an image processing device includes: an image quality enhancement circuit configured to generate second image data indicating a plurality of pixel values corresponding to a quadrangular shape by performing image quality enhancement processing on first image data; a map decoder configured to read a map, which includes a plurality of pixel adjustment values for adjusting brightness of a first region of the second image data corresponding to a curved edge of a display panel, from a memory and provide alpha values indicated by the map; a processing circuit configured to generate third image data by adjusting the brightness of the first region by applying the alpha values to the second image data; and a transmission circuit configured to output the third image data to a display driving integrated circuit.

According to another aspect of an example embodiment, an operating method of an image processing device includes: generating second image data indicating a plurality of pixel values by performing image quality enhancement processing on first image data that is received; reading a map including a plurality of pixel adjustment values for adjusting brightness of a first region of the second image data corresponding to a curved edge of a display panel from an external memory by using a map decoder; performing processing on the second image data based on the map to generate third image data using a processing circuit, wherein the processing includes adjusting the brightness of the first region of the second image data; and transmitting the third image data to a display driving integrated circuit.

According to another aspect of an example embodiment, a display system includes: a display panel; a display driving integrated circuit configured to drive the display panel; and an application processor configured to generate second image data by adjusting brightness of a first region of first image data corresponding to a curved edge of the display panel by performing processing on the first image data based on a map including a plurality of pixel adjustment values respectively corresponding to a plurality of pixels of the display panel, and provide the second image data to the display driving integrated circuit.

BRIEF DESCRIPTION OF DRAWINGS

The above and other aspects and features of the present disclosure will be more clearly understood from the following description of example embodiments, taken in conjunction with the accompanying drawings, in which:

FIG. 4 is a table illustrating alpha values for each region of an RCD map, according to an example embodiment;

FIG. 7 is a table illustrating compression modes of an RCD map according to an example embodiment;

DETAILED DESCRIPTION

Figure 1:
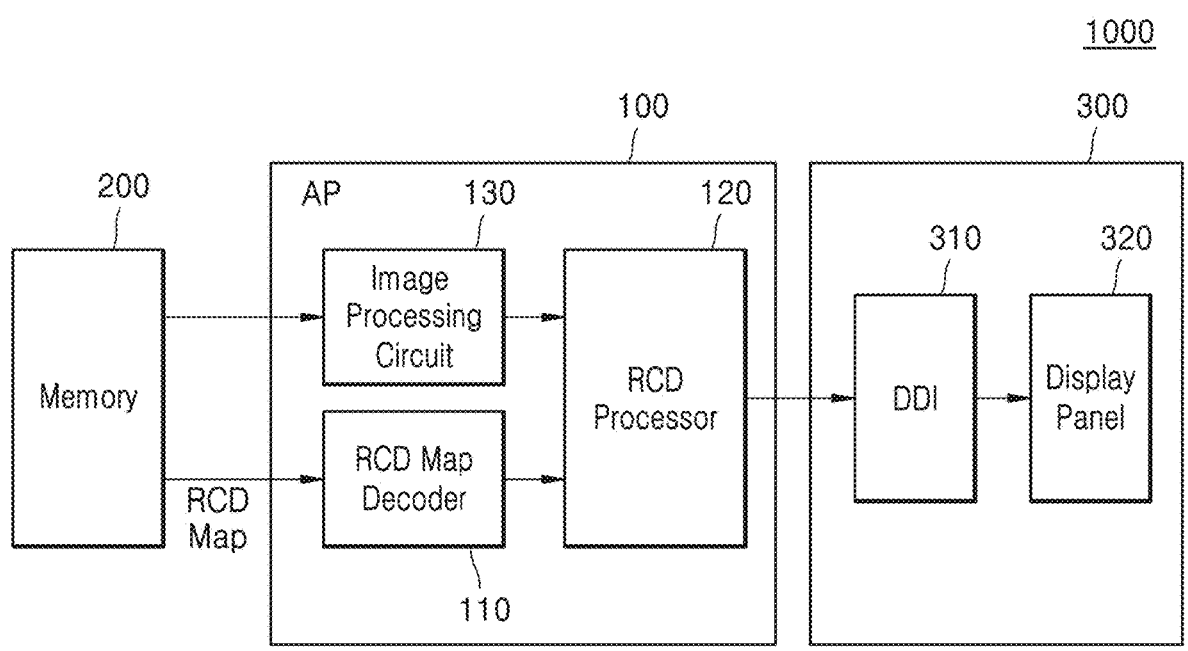
FIG. 1 is a block diagram illustrating a display system according to an example embodiment.

Example embodiments will be described with reference to the accompanying drawings. Like components are denoted by like reference numerals throughout the specification, and repeated descriptions thereof are omitted. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating a display system according to an example embodiment.

A display system 1000 according to example embodiments may include an electronic device including an image display function. For example, the electronic device may include at least one of a smartphone, a tablet personal computer (PC), a mobile phone, a videophone, an e-book reader, a desktop PC, a laptop PC, a netbook computer, a personal digital assistant (PDA), a portable multimedia player (PMP), an MP3 player, a mobile medical device, a camera, and a wearable device (for example, a head-mounted device (HMD), such as electronic glasses, electronic clothing, an electronic bracelet, an electronic necklace, an electronic appcessory, an electronic tattoo, and a smart watch).

According to some example embodiments, the display system 1000 may include a smart home appliance having an image display function. The smart home appliance may include at least one of, for example, a television, a digital video disc (DVD) player, an audio device, a refrigerator, an air conditioner, a vacuum cleaner, an oven, a microwave oven, a washing machine, an air purifier, a set-top box, a television box (for example, Samsung HomeSync™, Apple TV™, or Google TV™), a game console, an electronic dictionary, an electronic key, a camcorder, and an electronic picture frame.

According to some example embodiments, the display system 1000 may include at least one of various medical devices (for example, magnetic resonance angiography (MRA) medical devices, magnetic resonance imaging (MRI) medical devices, computed tomography (CT) medical devices, a camera, an ultrasound machine, and so on), a navigation device, a global positioning system (GPS) receiver, an event data recorder (EDR), a flight data recorder (FDR), an automobile infotainment device, a marine electronic device (for example, a marine navigation device, a gyrocompass, or so on), avionics, a security device, a vehicle head unit, an industrial or home robot, an automatic teller's machine (ATM) of a financial institution, and a point of sales (POS) device.

According to some example embodiments, the display system 1000 may include at least one of a part of furniture or a building/structure including an image display function, an electronic board, an electronic signature receiving device, and a projector, or at least one of various measurement devices (for example, a device for measuring water, electricity, gas, and radio waves, and so on). An electronic device including the display system 1000 according to various example embodiments may be one or a combination of the various devices described above. In addition, the display system 1000 may be a flexible device. It is apparent to those skilled in the art that the display system 1000 according to various example embodiments is not limited to the devices described above.

Referring to FIG. 1, the display system 1000 may include an image processing device 100, a memory 200, and a display device 300, and the display device 300 may include a display driving integrated circuit (hereinafter, referred to as a DDI) 310, and a display panel 320. The display system 1000 may further include other components (for example, a camera interface, an external memory, and so on). According to some example embodiments, the display system 1000 may be implemented with one module, one system on chip, or one package, such as a multi-chip package.

The image processing device 100 may generally control an operation of the display system 1000 and may specifically control the display device 300. The image processing device 100 may be implemented with a printed circuit board (PCB), such as a motherboard, an integrated circuit (IC), or a system on chip (SoC). The image processing device 100 may be referred to as an application processor, a multimedia processor, or an integrated multimedia processor.

The image processing device 100 may provide image-processed image data to be displayed on a display panel 320 to the display device 300. The display panel 320 may have one or more curved edges, which may correspond to edges along round corners or edges along a pinhole region that may facilitate a front camera. The image processing device 100 may perform round corner display (RCD) processing on image data to be displayed on the display panel 320, based on an RCD map, to provide a natural display along the curved edges. The RCD map may include a plurality of pixel adjustment values respectively corresponding to a plurality of pixel values of image data. The RCD-processed image data may adjust the brightness of pixel values corresponding to the curved edges of the display panel 320. When an RCD-processed image is displayed on the display panel 320, pixels along the curved edges may appear naturally to a user.

The image processing device 100 may include an RCD map decoder 110, an RCD processor 120 (or referred to as an RCD processing circuit), and at least one image processing circuit (or image processing intellectual property (IP)) 130.

At least one image processing circuit 130 may generate image data of one frame by blending a plurality of pieces of layer data or perform image processing on the image data according to a picture quality enhancement algorithm.

The RCD map decoder 110 may read an RCD map from the memory 200, for example, a system memory, and provide the read RCD map to the RCD processor 120. The RCD map may include a plurality of pixel adjustment values respectively corresponding to a plurality of pixels of image data. For example, the RCD map may be implemented as an alpha map, and the plurality of pixel adjustment values may be a plurality of alpha values respectively corresponding to the plurality of pixel values. Hereinafter, a pixel adjustment value may be referred to as an alpha value.

In some example embodiments, the RCD map may include a first alpha value, a second alpha value, and a third alpha value, respectively corresponding to a red sub-pixel value, a green sub-pixel value, and a blue sub-pixel value included in the plurality of pixel values. In this regard, the RCD map may include RCD sub-maps for each of a red channel, a blue channel, and a green channel.

In some example embodiments, the RCD map decoder 110 may perform transformation processing, such as flip or rotation, on the RCD map. The RCD map decoder 110 may provide the RCD processor 120 with alpha values of a region corresponding to at least one region of interest (ROI) of the display panel 320 in the RCD map.

In some example embodiments, the RCD map may be compressed and stored in the memory 200, and the RCD map decoder 110 may read a compressed stream of the compressed RCD map and decompress the compressed stream. The RCD map decoder 110 may decode the compressed stream to reconstruct an RCD map and provide the reconstructed RCD map to the RCD processor 120. Because the RCD map is compressed, a size of a storage region of the memory 200 for storing the RCD map may be reduced.

In some example embodiments, the RCD map decoder 110 may include an internal memory to store an RCD map read from the memory 200 and use the RCD map stored in the internal memory. When the RCD map is stored in the internal memory and an updated RCD map is not required, the RCD map is read from the memory 200 only once, and accordingly, a memory bandwidth for accessing the memory 200 may be reduced.

In some example embodiments, the RCD map decoder 110 may sequentially transmit corresponding alpha values to the RCD processor 120 in synchronization with the sequence in which a plurality of pixel values of image data are sequentially output from at least one image processing circuit 130 to the RCD processor 120. For example, the image data may include a plurality of pixel values arranged in n rows and m columns, and the RCD map may also include a plurality of alpha values arranged in n rows and m columns A plurality of pixel values of image data may be sequentially output row-by-row from at least one image processing circuit 130 to the RCD processor 120, and the RCD map decoder 110 may sequentially output a plurality of alpha values respectively corresponding to the plurality of pixel values to the RCD processor 120 row-by-row, based on a pixel synchronization signal provided from at least one image processing circuit 130.

The RCD processor 120 may receive image data (for example, image data with enhanced image quality) from at least one image processing circuit 130, receive alpha values respectively corresponding to the plurality of pixel values from the RCD map decoder 110, and generate RCD image data by applying the alpha values to the image data. In this regard, the RCD processor 120 may apply a corresponding alpha value among a plurality of alpha values of the RCD map to each of the plurality of pixel values of the image data. The RCD image data may be transmitted to the DDI 310.

In some example embodiments, the RCD processor 120 may sequentially receive the plurality of pixel values of the image data from at least one image processing circuit 130 and may sequentially receive the plurality of alpha values from the RCD map decoder 110. The RCD processor 120 may apply the alpha values to the pixel value received in real time. In this regard, the RCD processor 120 may perform RCD processing on image data in real time. For example, the RCD processor 120 may perform RCD processing in real time in units of the received pixel values of one row and transmit RCD image data, for example, the RCD-processed pixel values of one row, to the DDI 310.

In some example embodiments, the image processing device 100 may further include a compressor to compress RCD image data and output the compressed RCD image data to the DDI 310.

The memory 200 may be implemented as a system memory of the display system 1000 and may include volatile memory, such as dynamic random access memory (DRAM) or static random access memory (SRAM), or non-volatile memory, such as NAND flash memory, phase random access memory (PRAM), ferroelectric random access memory (FeRAM), resistive random access memory (RRAM), or magnetoresistive random access memory (MRAM). The memory 200 may store an RCD map. The memory 200 may store a compressed RCD map. The memory 200 may also store image data or data of a plurality of layers constituting the image data.

The DDI 310 may be implemented with one or a plurality of semiconductor chips. In some example embodiments, the DDI 310 and the display panel 320 may be implemented as a single module. The DDI 310 may be mounted on the display panel 320. In other example embodiments, the DDI 310 may be integrated in the same semiconductor chip as the image processing device 100.

The DDI 310 may receive RCD image data from the image processing device 100 and display an image corresponding to the RCD image data on the display panel 320. In some example embodiments, the DDI 310 may receive compressed RCD image data and decompress the compressed RCD image data. In some example embodiments, the DDI 310 may include an image processing circuit which is configured to perform image processing on the RCD image data, and display an image corresponding to the image-processed RCD image data on the display panel 320. For example, the DDI 310 may perform image processing based on characteristics (for example, gamma characteristics and luminance characteristics) of the display panel 320 in the RCD image data.

The display panel 320 may include a plurality of pixels arranged in rows and columns, and may display images in units of frames. The display panel 320 may receive drive signals generated based on the RCD image data from the DDI 310 and display an image corresponding to the RCD image data, based on the drive signals. The display panel 320 may include any one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light value (GLV) display, a plasma display panel (PDP), an electro luminescent display (ELD), and a vacuum fluorescent display (VFD), and may also include a flat panel display of another type or a flexible display.

As described above, the display panel 320 may have various curved edges, and the curved edges may be provided on, for example, round corners or a pinhole region for a front camera.

In the display system 1000 according to an example embodiment, the image processing device 100 may perform RCD processing on image data. A manufacturing process of the image processing device 100 may be more precise than a manufacturing process of the DDI 310. Power consumption and a circuit area of the display system 1000 may be further reduced when the image processing device 100 performs RCD processing like the display system 1000 according to example embodiments rather than when the DDI 310 performs the RCD processing. In addition, because an RCD map used in RCD processing is compressed and stored in a memory and the image processing device 100 decompresses the RCD map and uses the decompressed RCD map in RCD processing, a size of a storage region required to store the RCD map in the memory may be reduced. In addition, the image processing device 100 may perform various types of processing on the RCD map, and accordingly, the performance of the RCD processing may be improved.

Figure 2:
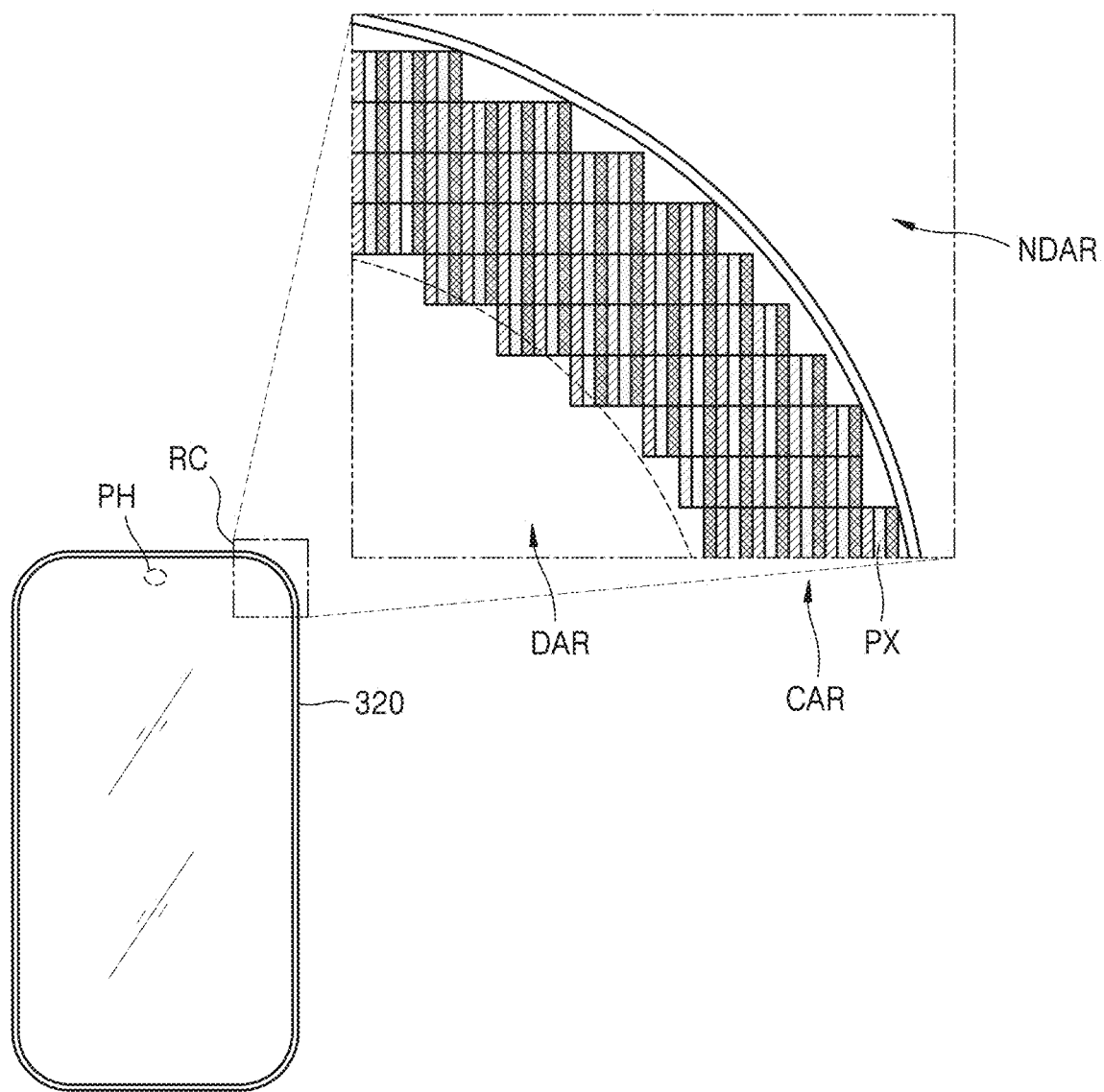
FIG. 2 illustrates a display panel having round corners according to an example embodiment.

FIG. 2 illustrates a display panel having round corners according to an example embodiment.

Referring to FIG. 2, the display panel 320 may include a round corner RC and/or a pin hole region PH.

The round corner RC may include a normal display region DAR in which image signals according to pixel values are displayed, a curved region CAR in which image signals according to adjusted pixel values are displayed, and a non-display region NDAR in which the image signals are not displayed. For example, the non-display region NDAR may indicate a panel cutting region in which pixels PX are not arranged. The pinhole region PH is also divided into a non-display region NDAR and a normal display region DAR and may include a curved region CAR between the non-display region NDAR and the normal display region DAR. For example, a camera (for example, a front camera) may be in the non-display region NDAR, which may be a pinhole. In some example embodiments, a camera (for example, an under-display camera) may be under the pinhole region PH of the display panel 320, and the pinhole region PH may be divided into the normal display region DAR and the curved region CAR inside a pinhole. A camera is under the curved region CAR, and pixel values of the curved region CAR may be adjusted such that the camera is not recognized, that is, such that luminance of the curved region CAR appears to not be different from luminance of the normal display region DAR.

FIGS. 3A, 3B, 3C, and 3D illustrate RCD maps according to example embodiments, and FIG. 4 illustrates a table including alpha values for each region of the RCD map according to an example embodiment.

Figure 3A:
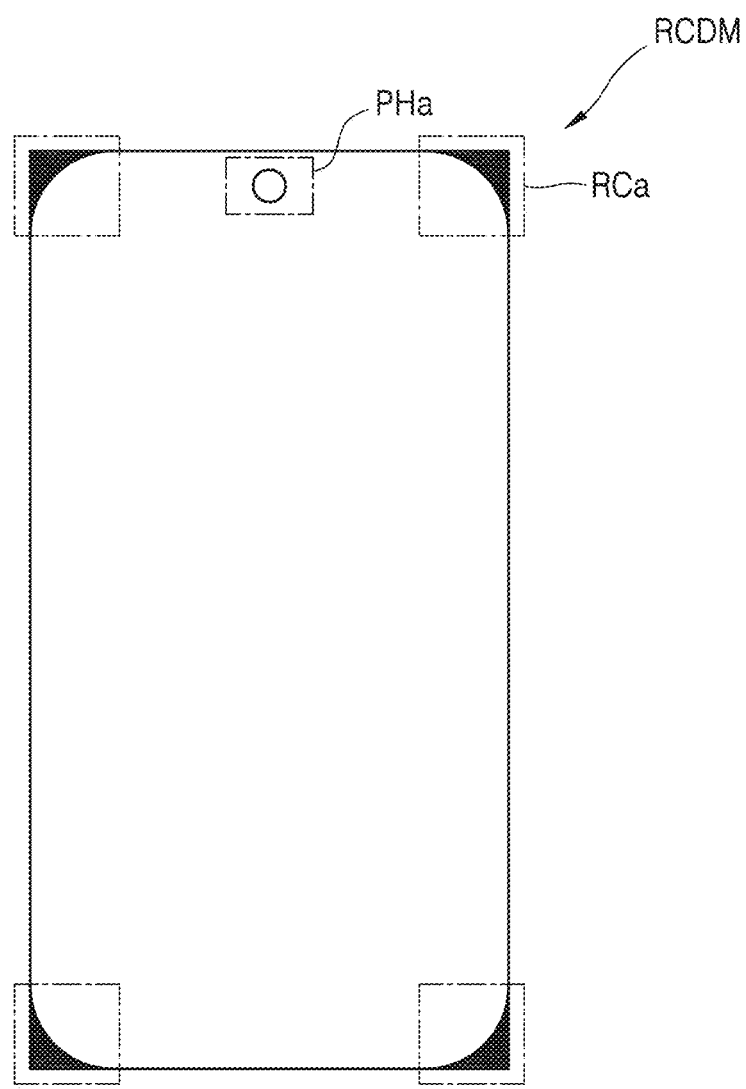
FIGS. 3A, 3B, 3C, and 3D illustrate RCD maps according to example embodiments.
Figure 3B:
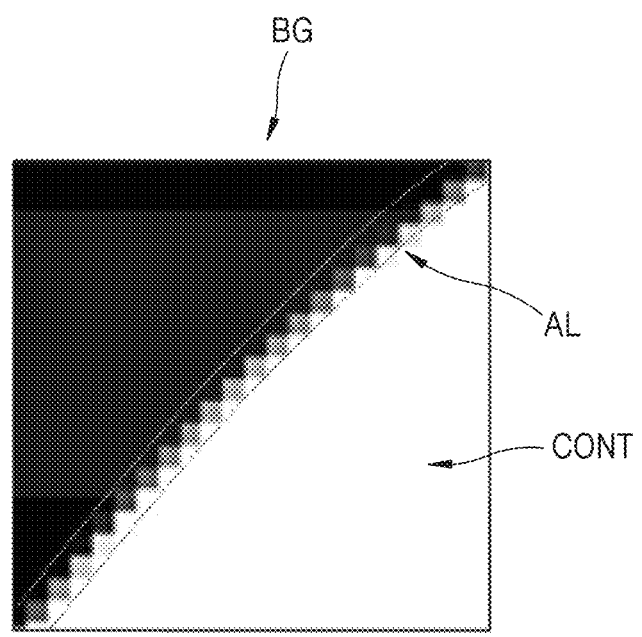
Figure 3C:
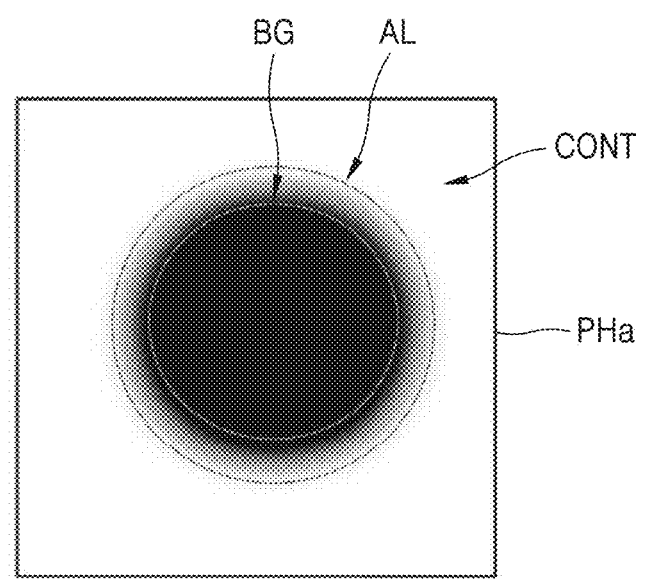
Figure 3D:
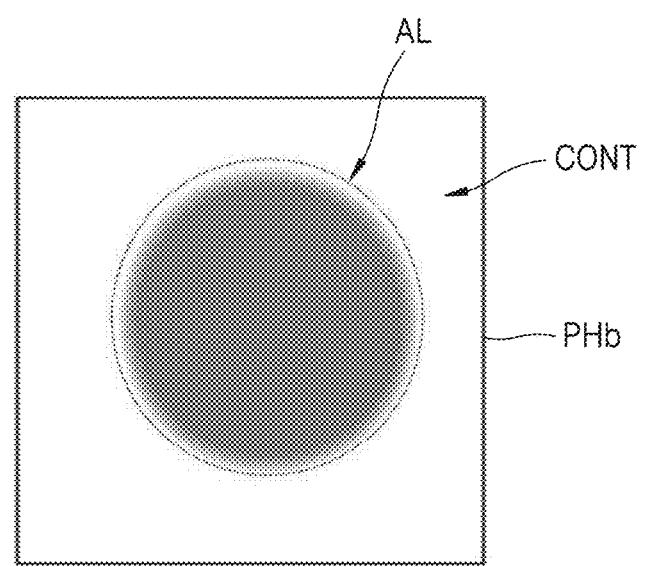

FIG. 3A illustrates the entire RCD map, and FIG. 3B to FIG. 3D illustrate partial regions of the entire RCD map of FIG. 3A.

Referring to FIG. 3A, an RCD map RCDM may have a rectangular shape corresponding to image data, and a plurality of alpha values may be arranged in a matrix to correspond respectively to a plurality of pixel values of the image data. The RCD map RCDM may include round corners RCa and a pinhole region PHa, and the round corners RCa and the pinhole region PHa respectively correspond to the round corners RC and the pinhole region PH of the display panel 320 in FIG. 2.

In the RCD map RCDM, a region marked in white is a contents region CONT and corresponds to the normal display region DAR of the display panel 320 in FIG. 2, and a region marked in black is a background region BG and corresponds to the non-display region NDAR of the display panel 320.

FIG. 3B illustrates one of the four round corners RCa in the RCD map RCDM in FIG. 3A in more detail.

Referring to FIG. 3B, the round corner RCa of the RCD map RCDM includes a background region BG, an aliasing region AL, and a contents region CONT. The background region BG, the aliasing region AL, and the contents region CONT may respectively correspond to the non-display region NDAR, the curved region CAR, and the display region DAR of the display panel 320.

Alpha value setting of the background region BG, the aliasing region AL, and the contents region CONT is described with reference to FIG. 4. Here, as an example, it is assumed that the alpha values are represented as 8-bit data.

Referring to FIG. 4, an alpha value of the background region BG may be '0'. In this regard, the alpha value may be set to the least value. In this case, a mixed value, for example, the alpha value for each of red (R), green (G), and blue (B) channels may be set by a user, and for example, a default value may be set to '0' for each of the R, G, and B channels. When the least alpha value is applied to a pixel value, the pixel value is adjusted to '0'. In this regard, the pixel value is adjusted to the least grayscale value. In this disclosure, 'user' includes manufacturers as well as end users.

The alpha value of the contents region CONT may be '255'. In this regard, the alpha value may be set to the greatest value among values that may be represented as 8-bit data. When the greatest alpha value is applied to a pixel value, the pixel value is not adjusted. In this regard, the brightness of a signal output from a pixel is not reduced based on the alpha value. The mixed value, for example, the alpha value for each of the R, G, and B channels, may not be preset and not adjustable by the user, and the alpha value for each of the R, G, and B channels may be preset to '255'.

An alpha value of the aliasing region AL may be variable. The alpha value of the aliasing region AL may be '0', '255', or a value between '0' and '255'. Different portions of the aliasing region AL may have different alpha values. For example, as illustrated in FIG. 3B, an alpha value to be applied to a pixel value close to the contents region CONT of the aliasing region AL may be set to the greatest alpha value or a value close to the greatest alpha value, and an alpha value to be applied to a pixel value close to the background region BG may be set to the least alpha value or a value close to the least alpha value. Accordingly, the brightness of the curved region CAR of the display panel 320 may be gradually reduced from the display region DAR. However, this is only an example, and the alpha value of the aliasing region AL may be set in various ways. The mixed value, for example, the alpha value for each of the R, G, and B channels, may be set by the user, and for example, the default value may be set to '0' for each of the R, G, and B channels. The display panel 320 may display a user interface, for example, under control of the image processing device 100 and/or the DDI 310, to allow the alpha value for each of the R, G, and B channels to be modified by the user.

FIG. 3C illustrates the pinhole region PHa of the RCD map RCDM in FIG. 3A in more detail.

Referring to FIG. 3C, the pinhole region PHa includes a background region BG, an aliasing region AL, and a contents region CONT. A round region in the center of the pinhole region PHa is the background region BG and corresponds to a physical pinhole region formed in the center of the pinhole region PH of the display panel 320, that is, the non-display region NDAR. A camera may be exposed through a pinhole.

Referring to FIG. 3D, the pin hole region PHb includes an aliasing region AL and a contents region CONT. When the camera under a pinhole region PHb of the display panel 320 is implemented as an under-display camera, a physical pinhole may not be formed in the center of the pinhole region PH. Therefore, the background region BG may not be formed, and the aliasing region AL may extend across an entire width of the under-display camera. As the under-display camera is under the pinhole region PH of the display panel 320, the brightness of the pinhole region PH may be different from the brightness of a surrounding region, that is, the display region DAR. Therefore, in the pinhole region PHa of the RCD map RCDM, pixel values of the pinhole region PH of the display panel 320 may be adjusted for uniform brightness by applying alpha values of the aliasing region AL to the pixel values of the pinhole region PH.

Figure 5A:
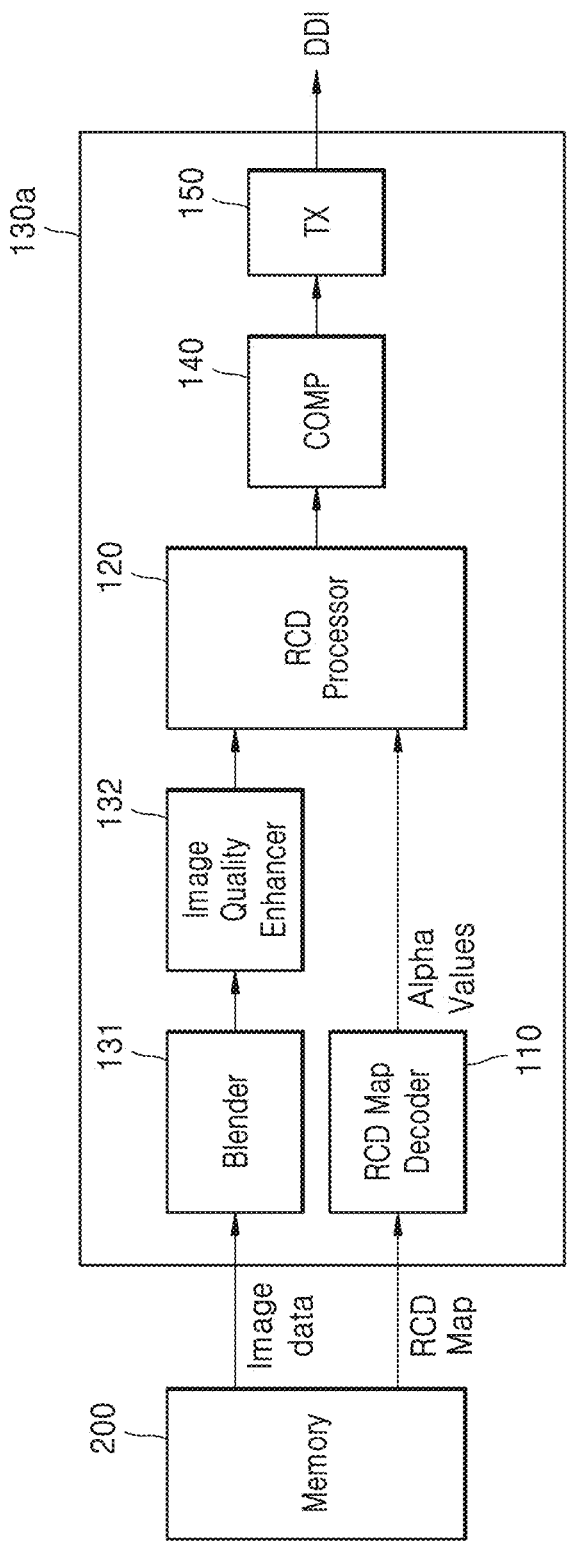
FIGS. 5A and 5B illustrate implementation examples of an image processing device according to example embodiments.
Figure 5B:
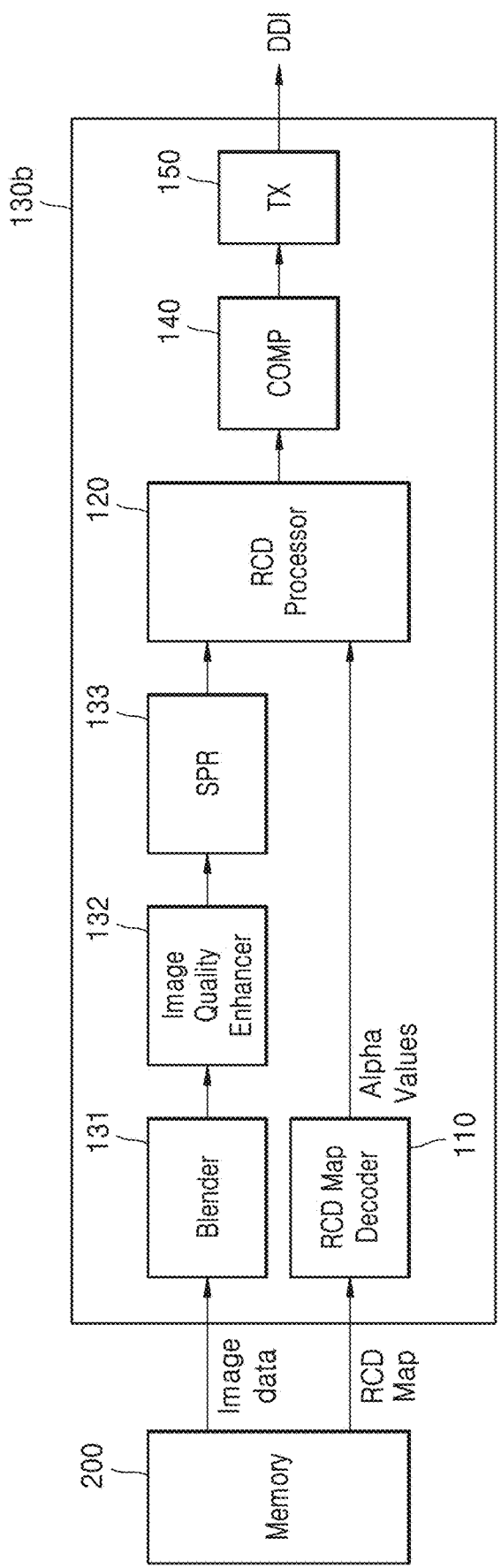

FIGS. 5A and 5B illustrate implementation examples of an image processing device, according to example embodiments. For the sake of convenience of description, the memory 200 is also illustrated in FIGS. 5A and 5B.

Referring to FIG. 5A, an image processing device 130a may include a blender 131, an image quality enhancer 132, an RCD map decoder 110, an RCD processor 120, a compressor (COMP) 140, and a transmission circuit (TX) 150.

The image processing device 130a may further include another image processing circuit that performs image processing.

The blender 131 may receive image data from the memory 200 (or an image generator). The image data may include a plurality of pieces of layer data indicating a plurality of images to be displayed in one frame (one screen) of the display panel 320 in FIG. 1. The blender 131 may generate first image data including a plurality of pixel values corresponding to one screen by blending the plurality of pieces of layer data.

The image quality enhancer 132 may perform image processing of image data, including first image data received from the blender 131, to enhance image quality based on at least one image quality enhancement algorithm.

For example, the image quality enhancement algorithm may include detail enhancement (DE), scaling (scaling or scaler), adaptive tone map control (ATC), hue saturation control (HSC), gamma (gamma and de-gamma), android open source project (AOSP), color gamut control (CGC), and dithering (dithering or dither). The DE may be an algorithm for making an outline of an image distinct, the scaling may be an algorithm for changing a size of an image, the ATC may be an algorithm for improving outdoor visibility, the HSC may be an algorithm for improving color and saturation for impression of a color, the gamma may be an algorithm for improving gamma correction, the AOSP may be an algorithm for processing an image transformation matrix (for example, a mode for color weakness, a night mode, and so on) defined by the Android operating system (OS), the CGC may be an algorithm for matching color coordinates of a display panel, and the dithering may be an algorithm for representing an effect of a high-bit color by using a limited color. However, the image quality enhancement algorithm is not limited thereto and may further include other image quality enhancement algorithms.

The RCD map decoder 110 may read (or load) an RCD map from the memory 200 and transmit information based on the RCD map, such as alpha values, to the RCD processor 120. The RCD processor 120 may generate RCD image data, for example, third image data, by applying the alpha values to image data, including second image data received from the image quality enhancer 132. Because the RCD map decoder 110 and the RCD processor 120 are described with reference to FIG. 1, redundant descriptions thereof are omitted.

The COMP 140 may generate compressed RCD image data by compressing the RCD image data received from the RCD processor 120, for example, the third image data. For example, the COMP 140 may compress the RCD image data based on the display stream compression (DSC) standard or the VESA Display Codec for Mobile (VDC-M) standard.

The TX 150 may transmit the compressed RCD image data to the DDI 310 in FIG. 1. The TX 150 may transmit the compressed RCD image data to the DDI 310 based on an interface set for communication with the DDI 310, for example, a Display Serial Interface (DSI) of a mobile industry processor interface (MIPI).

Referring to FIG. 5B, an image processing device 130b may include a blender 131, an image quality enhancer 132, a sub-pixel rendering (SPR) circuit 133, an RCD map decoder 110, an RCD processor 120, a COMP 140, and a transmission circuit (TX) 150.

The image processing device 130b of FIG. 5B may include the SPR circuit 133. The SPR circuit 133 may increase the resolution of image data received based on an SPR algorithm, for example, second image data provided from the image quality enhancer 132.

The RCD processor 120 may be behind the SPR circuit 133 and may generate RCD image data by applying alpha values of an RCD map received from the RCD map decoder 110 to the image data received from the SPR circuit 133.

Operations of the blender 131, the image quality enhancer 132, the RCD map decoder 110, the RCD processor 120, the COMP 140, and the TX 150 are similar to operations of the blender 131, the image quality enhancer 132, the RCD map decoder 110, the RCD processor 120, the COMP 140, and the TX 150 illustrated in FIG. 5A, and accordingly, redundant descriptions thereof are omitted.

As described with reference to FIGS. 5A and 5B, the RCD processor 120 may be at a later stage of an image processing flow and may perform RCD processing on the image data image-processed by the blender 131, the image quality enhancer 132, and the SPR circuit 133. The RCD image data generated by the RCD processor 120 may be compressed and provided to the DDI 310.

Figure 6:
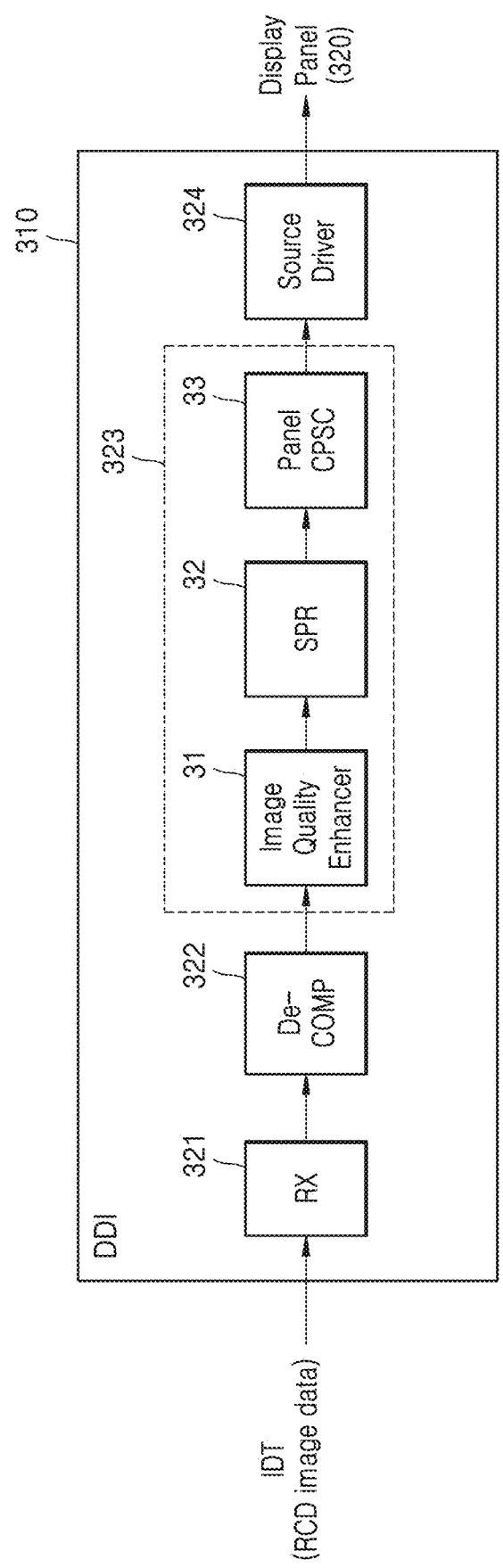
FIG. 6 is a block diagram illustrating a display driving integrated circuit according to an example embodiment.

FIG. 6 is a block diagram illustrating a DDI according to an example embodiment.

Referring to FIG. 6, the DDI 310 may include a reception circuit 321, a decompression circuit (De-COMP) 322, an image processing circuit 323, and a source driver 324, and the image processing circuit 323 may include an image quality enhancer 31, an SPR circuit 32, and a panel compensator (CPSC) 33. The DDI 310 may further include a frame memory, a gate driver, and a voltage generator.

The reception circuit 321 may receive image data IDT from the image processing device 100 in FIG. 1. The image data IDT may be the compressed RCD image data on which RCD processing and compression have been performed. The reception circuit 321 may receive the compressed RCD image data based on an interface set for communication with the image processing device 100, for example, a DSI of an MIPI.

The De-COMP 322 may decompress the compressed RCD image data. The De-COMP 322 may decompress the compressed RCD image data by using a decompression method corresponding to the compression method of the COMP 140 provided in the image processing device 100. For example, the De-COMP 322 may decompress the compressed RCD image data based on the DSC standard or the VDC-M standard.

The image processing circuit 323 may perform image processing on the decompressed RCD image data. For example, the image quality enhancer 31 may perform image processing based on an image quality enhancement algorithm, and the SPR circuit 32 may increase the resolution of RCD image data. In some example embodiments, when the image processing device 130b includes the SPR circuit 133 as illustrated in FIG. 5B, the image processing circuit 323 may not include the SPR circuit 32. The panel CPSC 33 may perform image quality compensation for the RCD image data based on panel characteristics of the display panel 320.

The image-processed RCD image data may be provided to the source driver 324. The source driver 324 may generate pixel signals, for example, grayscale voltages, based on pixel values of the received image data and provide the grayscale voltages to the display panel 320.

FIG. 7 is a table illustrating a compression mode of an RCD map according to an example embodiment. The RCD map may be compressed according to the compression mode of FIG. 7 and stored in the memory 200 in FIG. 1 as a compressed stream, and the RCD map decoder 110 in FIG. 1 may decode the compressed stream of the RCD map to reconstruct the RCD map.

Referring to FIG. 7, the compressed stream may include a prefix and a suffix, and the prefix may include 1-byte data (8-bit data) or 2-byte data (16-bit data). The suffix may include alpha values, and the amount of data, that is, the number of alpha values, may be determined according to unit attributes represented by data of upper 3 bits of the prefix. The remaining bits of the prefix may represent the number of pixels included in the suffix, that is, the number of alpha values. The alpha value may be represented by 1-byte data, that is, 8-bit data.

The index indicates a value represented by upper-3-bit data of the prefix. When the index is '0' or '1', the prefix may include 1-byte data, that is, 8-bit data, and data of 5 bits, excluding the upper 3 bits, indicates the number of alpha values included in the suffix, and when the index is '2', '3', '4', '5', or '6', the prefix may include 2-byte data, that is, 16-bit data, and data of 13 bits, excluding the upper 3 bits, indicates the number of alpha values included in the suffix.

When the index is '0' or '1', that is, when upper-3-bit data of the prefix is '000' or '001', alpha values included in the suffix correspond to an aliasing region, and the suffix may include alpha values less than 32. When the index is '0', alpha values of R, G, and B channels are the same as each other. Therefore, an alpha value corresponding to one pixel may be represented by 1-byte data. When the index is '1', the alpha values of the R, G, and B channels are different from each other. Because one pixel includes an R subpixel, a G subpixel, and a B subpixel, the alpha value corresponding to one pixel may include an alpha value for the R channel, an alpha value for the B channel, and an alpha value for the G channel and may be represented by 3-byte data.

When the index is '2' or '3', that is, when the upper-3-bit data of the prefix is '010' or '011', alpha values included in the suffix correspond to the aliasing region, and the suffix may include alpha values greater than or equal to 32. When the index is '2', the alpha values of the R, G, and B channels may be the same as each other, and when the index is '3', the alpha values of the R, G, and B channels may be set to be different from each other.

When the index is '4', that is, when the upper-3-bit data of the prefix is '100', the alpha values correspond to a background region. Lower-13-bit data of the prefix may indicate how many pixels of the background region have alpha values corresponding thereto. However, the background region has fixed alpha values, and accordingly, the suffix does not include alpha values.

When the index is '5', that is, when the upper-3-bit data of the prefix is '101', the alpha values included in the suffix correspond to a contents region. Because alpha values of the contents region are also fixed values, the suffix does not include the alpha values.

When the index is '6', that is, when the upper-3-bit data of the prefix is '110', a non-compression mode may be designated. The suffix may include alpha values corresponding to the number of pixels indicated by the lower-13-bit data of the prefix, and the alpha values may be respectively set for the R channel, the G channel, and the B channel. Because the alpha value corresponding to one pixel includes an alpha value for the R channel, an alpha value for the B channel, and an alpha value for the G channel, the alpha value may be represented by 3-byte data.

When the index is '7', that is, when the upper-3-bit data of the prefix is '111', the reserved mode may be designated.

Figure 8:
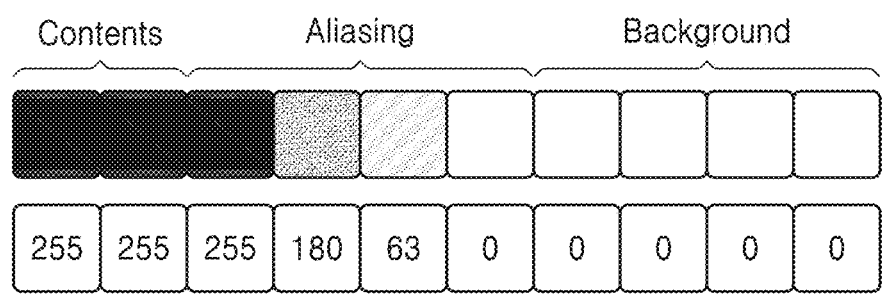
FIG. 8 illustrates example alpha values for regions of an RCD map according to an example embodiment.

FIG. 8 illustrates, as an example, alpha values for each region of an RCD map according to an example embodiment. It is assumed that the alpha values are represented by 8-bit data, that is, 1-byte data.

Referring to FIG. 8, the RCD map may include a background region, an aliasing region, and a contents region. Alpha values of the background region may be '0', and alpha values of the contents region may be '255', which is the greatest value that may be represented by 8-bit data. The aliasing region may have the least value of '0', the greatest value of '255', and values between the least value and the greatest value, for example, '180' and '63'.

Figure 9:
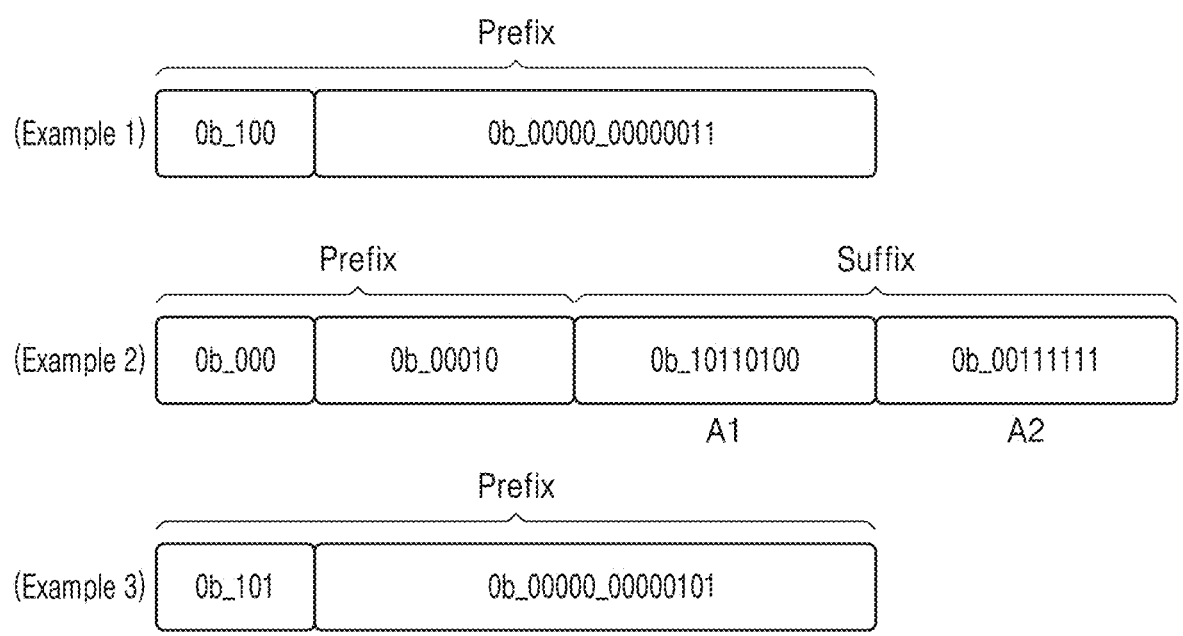
FIG. 9 illustrates an example compressed stream of an RCD map according to an example embodiment.

FIG. 9 illustrates, as an example, a compressed stream of an RCD map according to an example embodiment.

Referring to FIG. 9, in Example 1, when upper-3-bit data of the prefix is '100' and the lower-13-bit data is '00000_00000011', the index is '4', the number of corresponding pixels is 3, and the least alpha value, for example, '0', may be applied to the pixel values respectively corresponding to three values of the background region. The background region includes fixed alpha values, and accordingly, the suffix does not include alpha values.

In Example 2, when the upper-3-bit data of the prefix is '000' and the lower-5-bit data is '00010', the index is '0' and the number of corresponding pixels is 2. The suffix may include alpha values corresponding to two pixels of the aliasing region. The first alpha value A1 may be binary data '10110100' that is '128', and the second alpha value A2 may be binary data '00111111' that is '63'.

In Example 3, when the upper-3-bit data of the prefix is '101' and the lower-13-bit data is '00000_00000101', the index is '5' and the number of corresponding pixels is 5, and as described above, the contents region includes the fixed alpha values, and accordingly, the suffix does not include alpha values. The greatest alpha value, for example, '255', may be applied to pixel values respectively corresponding to five values of the contents region. The contents region includes fixed alpha values, and accordingly, the suffix does not include alpha values.

Figure 10:
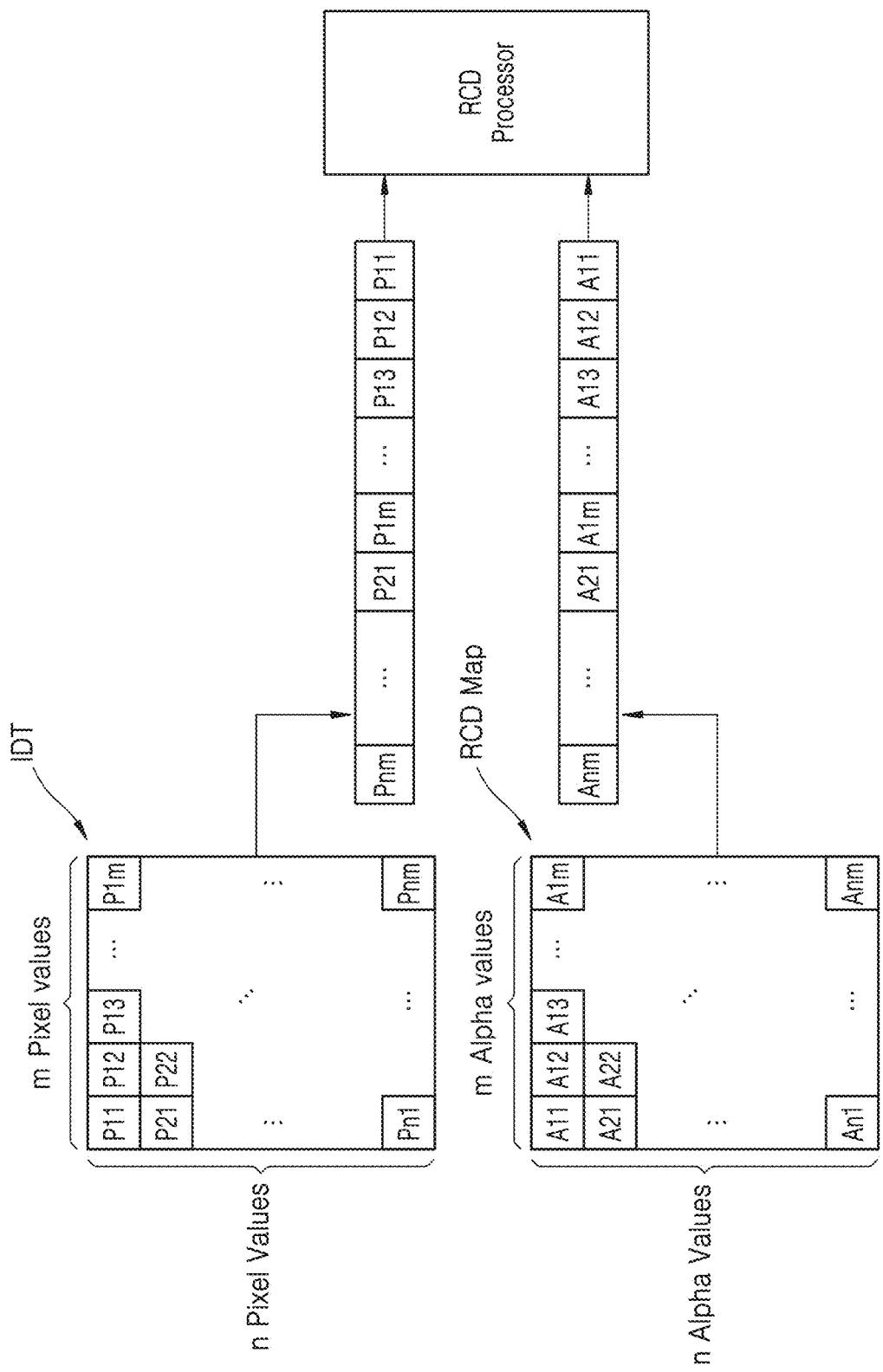
FIG. 10 illustrates a plurality of pixel values of image data and a plurality of alpha values of an RCD map received by an RCD processor in an image processing device according to an example embodiment.

FIG. 10 illustrates a plurality of pixel values of image data and a plurality of alpha values of an RCD map received by an RCD processor in an image processing device according to an example embodiment.

Referring to FIG. 10, image data IDT may include pixel values of n rows and m columns corresponding to the n rows and the m columns (where n and m are positive integers greater than or equal to 2). The RCD map may also include alpha values of n rows and m columns. In some example embodiments, each of the pixel values includes R, G, and B pixel values for the R, G, and B sub-pixels, and the alpha values may also include R, G, and B alpha values.

A plurality of pixel values of the image data may be provided to the RCD processor 120, and a plurality of alpha values of the RCD map may be provided to the RCD processor 120 in synchronization with the sequence in which the plurality of pixel values are transmitted. For example, pixel values P11, P12, P13, . . . , P1m, P21, P22, . . . , Pnm may be sequentially transmitted to the RCD processor 120 from an upper row of the image data IDT to a lower row thereof row-by-row, and the alpha values A11, A12, A13, . . . , A1m, A21, A22, . . . , Anm may be sequentially transmitted to the RCD processor 120 from an upper row of the RCD map to a lower row thereof row-by-row.

The RCD processor 120 may perform RCD processing of applying alpha values respectively to pixel values received in real time. The RCD processor 120 may output adjusted pixel values according to Equation 1 below.

$$P\_Rout = A\_R \times P\_Rin + (1 - A\_R) \times P\_BG$$

$$P\_Gout = A\_G \times P\_Gin + (1 - A\_G) \times P\_BG$$

$$P\_Bout = A\_B \times P\_Bin + (1 - A\_B) \times P\_BG \quad \text{Equation 1:}$$

Here, P_Rin is a red sub-pixel value among received pixel values, A_R is a value obtained by normalizing a red alpha value between 0 and 1, and P_Rout is an adjusted red sub-pixel value. P_BG is a pixel value in the background region and may be set in advance. P_Gin is a green sub-pixel value among the received pixel values, A_G is a value obtained by normalizing the green alpha value, and P_Gout is an adjusted green sub-pixel value. P_Bin is a blue sub-pixel value among the received pixel values, and A_B is a normalized blue alpha value. P_Bout is an adjusted blue sub-pixel value. In this way, alpha values of R, G, and B may be applied to sub-pixel values of each of R, G, and B.

Figure 11:
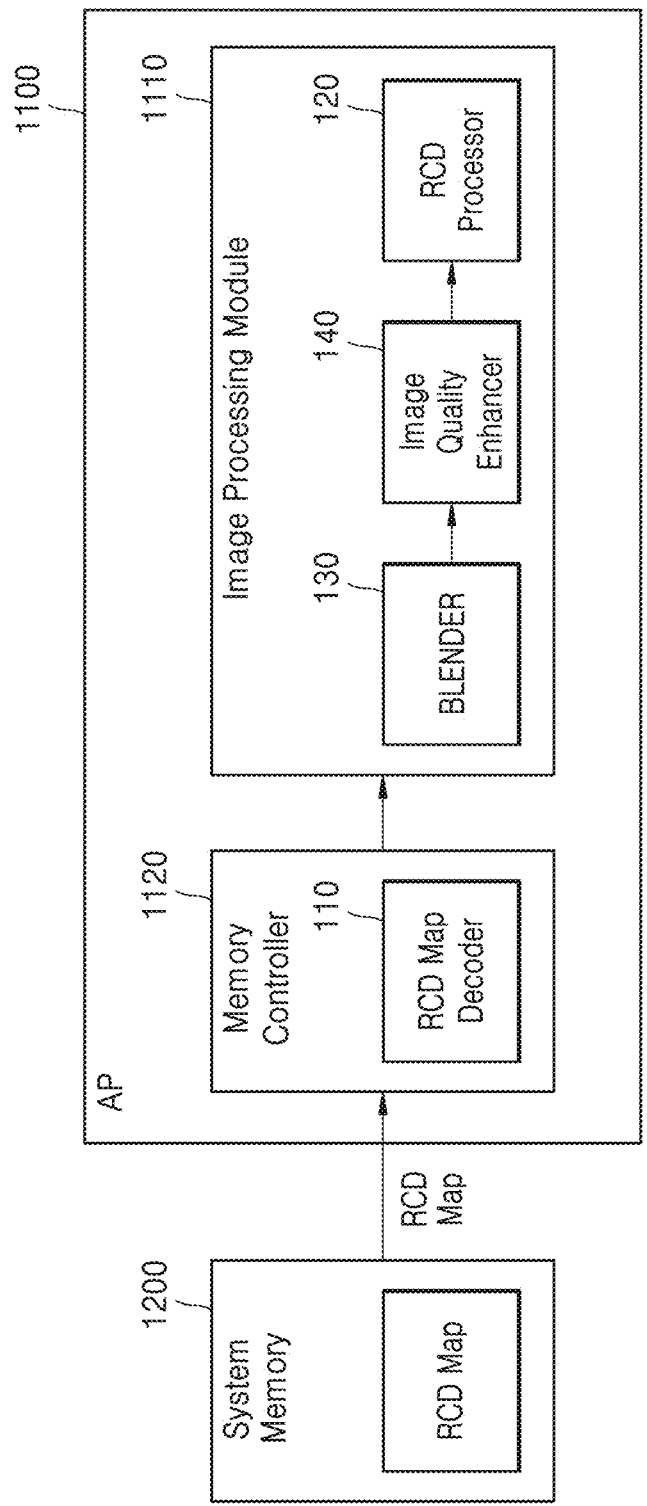
FIG. 11 is a schematic block diagram illustrating an application processor (AP) according to an example embodiment.

FIG. 11 is a schematic block diagram illustrating an application processor (AP) according to an example embodiment.

Referring to FIG. 11, an AP 1100 may include an image processing module 1110 and a memory controller 1120. The image processing module 1110 may include an RCD processor 120, and may include at least one image processing circuit, for example, a blender 130 and an image quality enhancer 140.

The memory controller 1120 may include an RCD map decoder 110. The RCD map decoder 110 may read an RCD map stored in a system memory 1200.

Figure 12A:
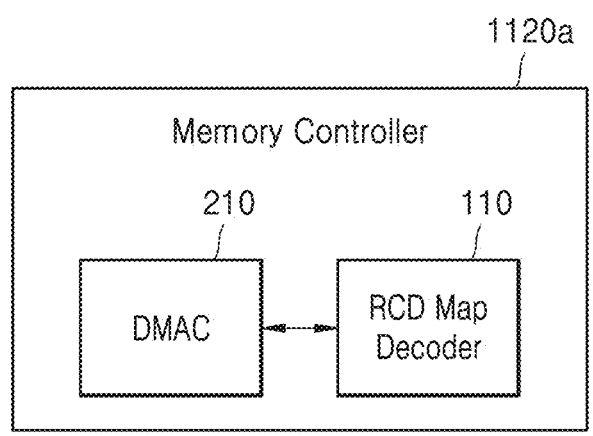
FIGS. 12A and 12B are block diagrams illustrating implementation examples of a memory controller according to an example embodiment.
Figure 12B:
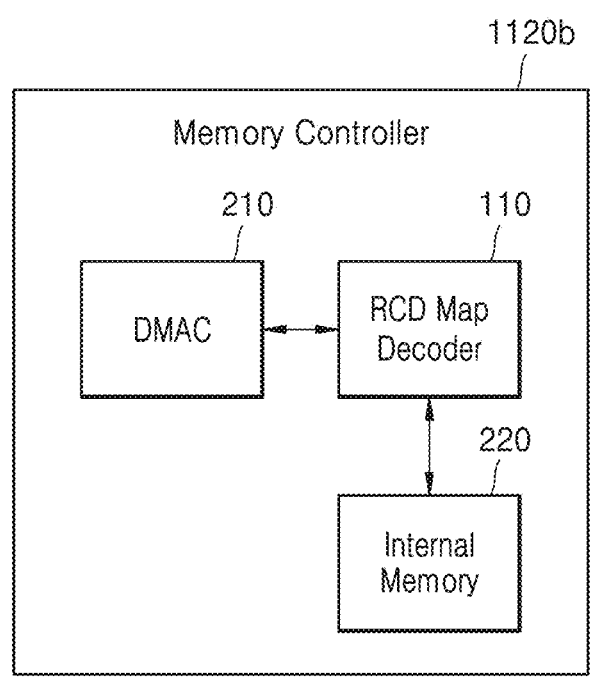

FIGS. 12A and 12B are block diagrams illustrating implementation examples of the memory controller 1120 of FIG. 11.

Referring to FIG. 12A, a memory controller 1120a may include the RCD map decoder 110 and a direct memory access (DMA) controller (DMAC) 210. The RCD map decoder 110 may generate a modified RCD map by performing flip and rotation on an RCD map using the DMA controller 210. In addition, the RCD map decoder 110 may read alpha values corresponding to a ROI of the display panel 320 in FIG. 1, among RCD maps stored in the system memory 1200, and provide the alpha values to the RCD processor 120 in FIG. 11. The RCD processor 120 may generate RCD image data by performing RCD processing on pixel values corresponding to the ROI.

Figure 13:
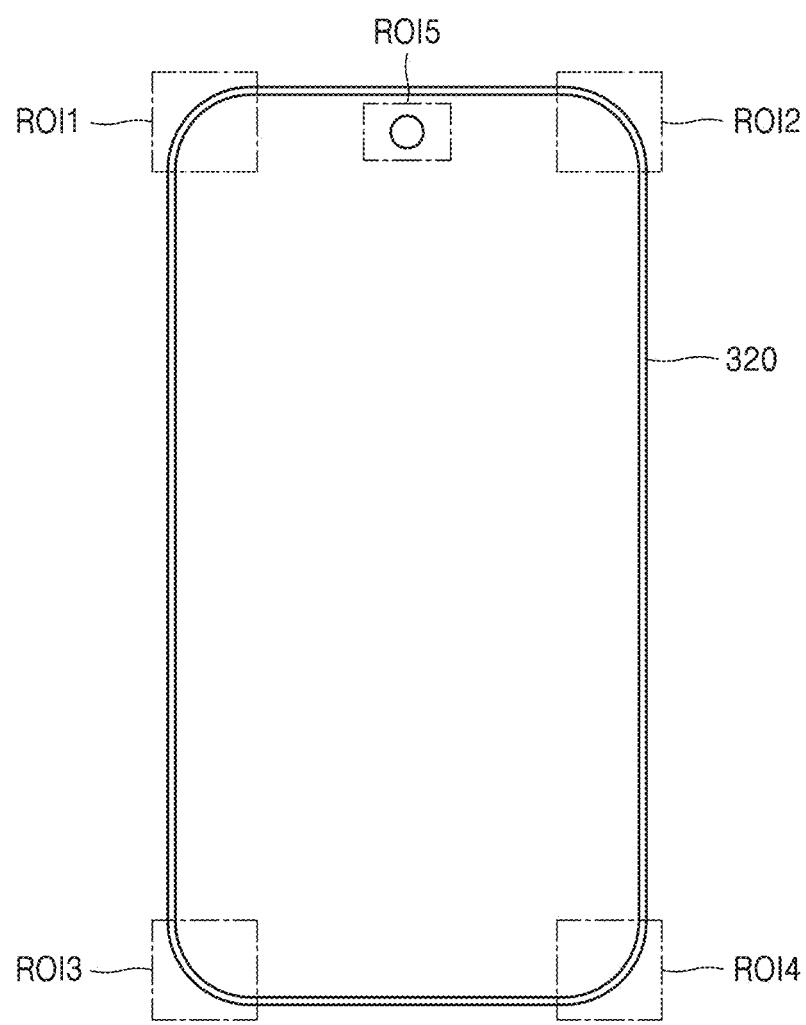
FIG. 13 illustrates a region of interest of a display panel according to an example embodiment.

FIG. 13 illustrates an ROI of a display panel.

Referring to FIG. 13, the display panel 320 may include at least one ROI, for example, first to fifth regions of interest ROI1 to ROI5. The regions of interest may correspond to a round corner or a pinhole region of the display panel 320.

Referring back to FIG. 12B, a memory controller 1120b may include the RCD map decoder 110, the DMA controller 210, and an internal memory 220. The internal memory 220 may include, for example, SRAM.

The RCD map decoder 110 may store an RCD map read from the system memory 1200 in FIG. 11 in the internal memory 220 and may continuously use, for example, the RCD map until the RCD map is updated. In some example embodiments, the RCD map decoder 110 may read a compressed RCD map stored in the system memory 1200 and decode a compressed stream of the compressed RCD map to reconstruct the RCD map. The reconstructed RCD map may be stored in the internal memory 220 and used. Alternatively, the RCD map decoder 110 may store the compressed RCD map in the internal memory 220, and may decode the RCD map compressed in the internal memory 220, that is, decompress the compressed RCD map to reconstruct the RCD map when RCD processing is required.

When an update of the RCD map is not required, the RCD map is read from the system memory 1200 only once, and may store the RCD map in the internal memory 220. Accordingly, a memory bandwidth for accessing the system memory 1200 may be reduced.

Figure 14:
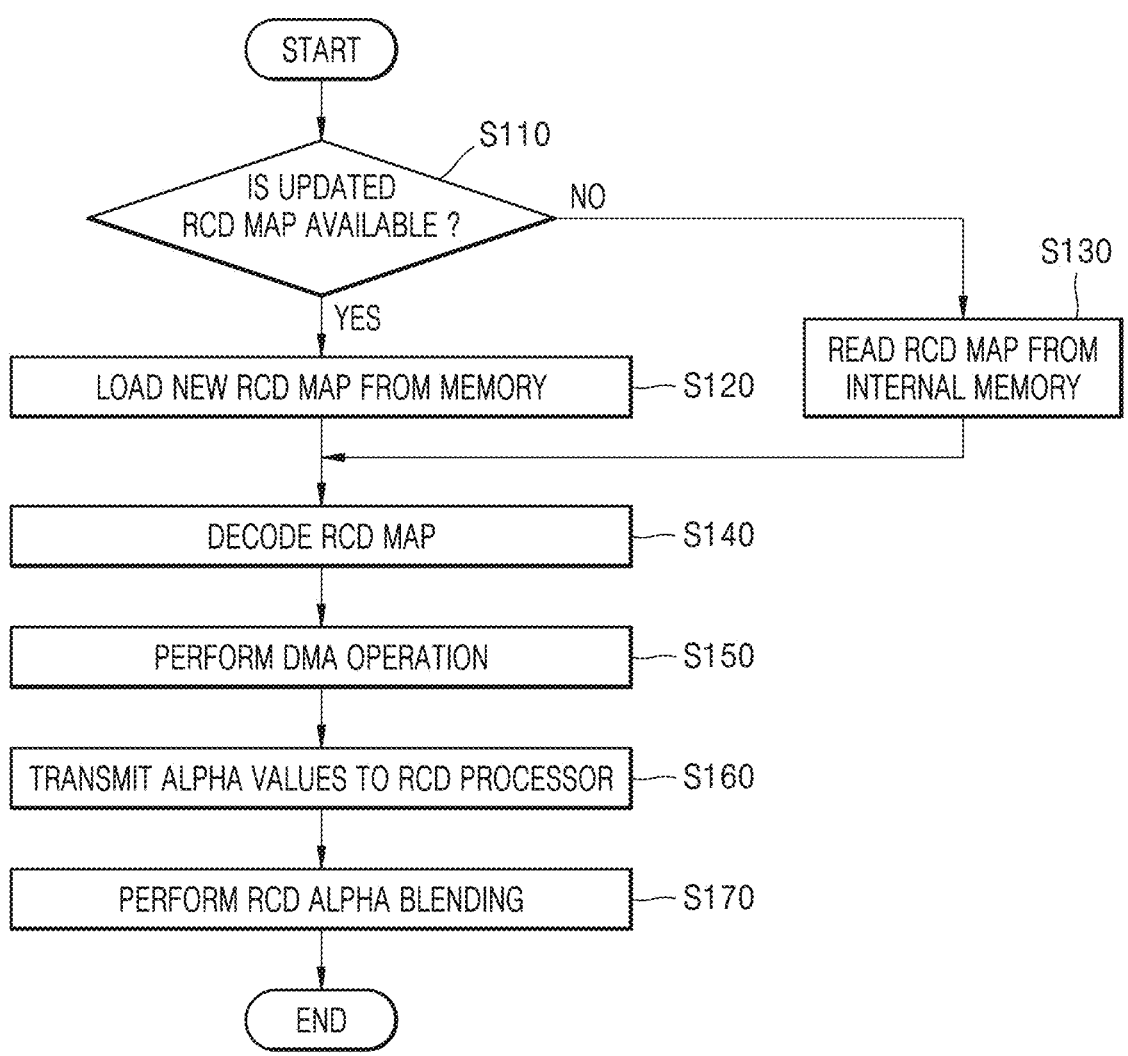
FIG. 14 is a flowchart illustrating an operating method of an image processing device, according to an example embodiment.

FIG. 14 is a flowchart illustrating an operating method of an image processing device, according to an example embodiment. The operation method of FIG. 14 may be performed by the image processing device 100 in FIG. 1 or the AP 1100 in FIG. 11. Descriptions of the image processing device 100 and the AP 1100 described with reference to FIGS. 1 to 13 and operations thereof may be applied. Operation S110 to operation S160 may be performed by the RCD map decoder 110 provided in the image processing device 100, and operation S170 may be performed by the RCD processor 120.

Referring to FIG. 14, the RCD map decoder 110 may check whether a new RCD map is stored in a memory (for example, 200 in FIG. 1 or 1200 in FIG. 11) (S110). In this regard, the RCD map decoder 110 may determine whether an updated RCD map is available.

When there is a new RCD map, the RCD map decoder 110 may load (or read) the new RCD map from the memory (S120). When there is no new RCD map, the RCD map decoder 110 may read an RCD map from the internal memory 220 in FIG. 12B.

In some example embodiments, when the RCD map read from the internal memory or an external memory is compressed, the RCD map decoder 110 may decode the compressed RCD map (S140).

The RCD map decoder 110 may perform a DMA operation (S150). In this regard, the RCD map decoder 110 may perform processing, such as rotation or flip, on the RCD map. In addition, the image processing device 100 may select alpha values of a region corresponding to an ROI of a display panel from the RCD map and reconstruct the RCD map.

The RCD map decoder 110 may transmit alpha values of the RCD map to the RCD processor 120 in FIG. 1 (S160). As described with reference to FIG. 10, the RCD map decoder 110 may transmit the alpha values of the RCD map to the RCD processor 120 in synchronization with the sequence in which pixel values of image data are output.

The RCD processor 120 may perform RCD alpha blending (S170). The RCD processor 120 may perform RCD processing on image data by using the alpha values respectively corresponding to pixel values. Accordingly, RCD image data may be generated.

Figure 15:
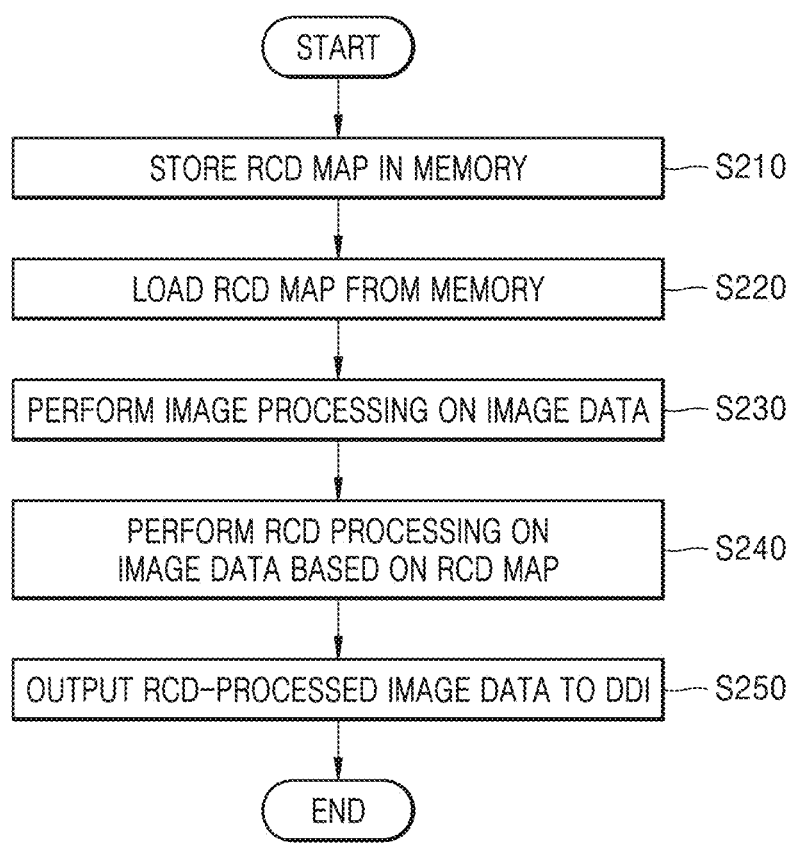
FIG. 15 is a flowchart illustrating an operating method of an image processing device, according to an example embodiment.

FIG. 15 is a flowchart illustrating an operating method of an image processing device according to an example embodiment. The operation method of FIG. 15 may be performed by the image processing device 100 in FIG. 1 or the AP 1100 in FIG. 11. Descriptions of the image processing device 100 and the AP 1100 described with reference to FIGS. 1 to 14 and operations thereof may be applied to the operating method.

Referring to FIG. 15, the image processing device 100 may store an RCD map in a memory (for example, 200 in FIG. 1 or 1200 in FIG. 11) (S210).

The image processing device 100 may load the RCD map from the memory when generating image data to be provided to the display device 300 in FIG. 1 (S220).

The image processing device 100 may also perform image processing on the image data (S230). The image processing device 100 may perform the image processing on the image data based on at least one image processing algorithm.

The image processing device 100 may perform RCD processing on the image data based on the RCD map (S240). A corresponding alpha value among a plurality of alpha values of the RCD map may be applied to each of a plurality of pixel values of the image data. The plurality of pixel values include R, G, and B sub-pixel values, and each of the plurality of alpha values may include R, G, and B alpha values. Each of the R, G, and B alpha values may be applied to each of the R, G, and B sub-pixel values.

The image processing device 100 may output RCD-processed image data, that is, RCD image data, to the DDI 310 in FIG. 1 (S250). In some example embodiments, the image processing device 100 may compress the RCD image data and transmit the compressed RCD image data to the DDI 310.

According to example embodiments, components of the image processing device 100 in FIG. 1, the AP 1100 in FIG. 11, and the DDI 310 in FIG. 1, for example, the RCD map decoder 110, the RCD processor 120, the blender 131, the image quality enhancer 132, the COMP 140, the TX 150, the SPR circuit 133, the reception circuit 321, the decompressor 322, and so on may be implemented by hardware, software, or a combination of hardware and software. The blender 131, the image quality enhancer 132, the RCD map decoder 110, the RCD processor 120, the compressor 140, and the decompressor 322 may be referred to as a blending circuit, an image quality enhancement circuit, a RCD map decoding circuit, a RCD processing circuit, a compression circuits, and a decompression circuit, respectively. In addition, the configurations described above may be implemented as at least one processor (for example, a central processing unit (CPU), a graphics processing unit (GPU), a microprocessor, or so on) executing one or more instructions stored in a memory. At least one processor may perform the operations described above for the configurations.

Figure 16:
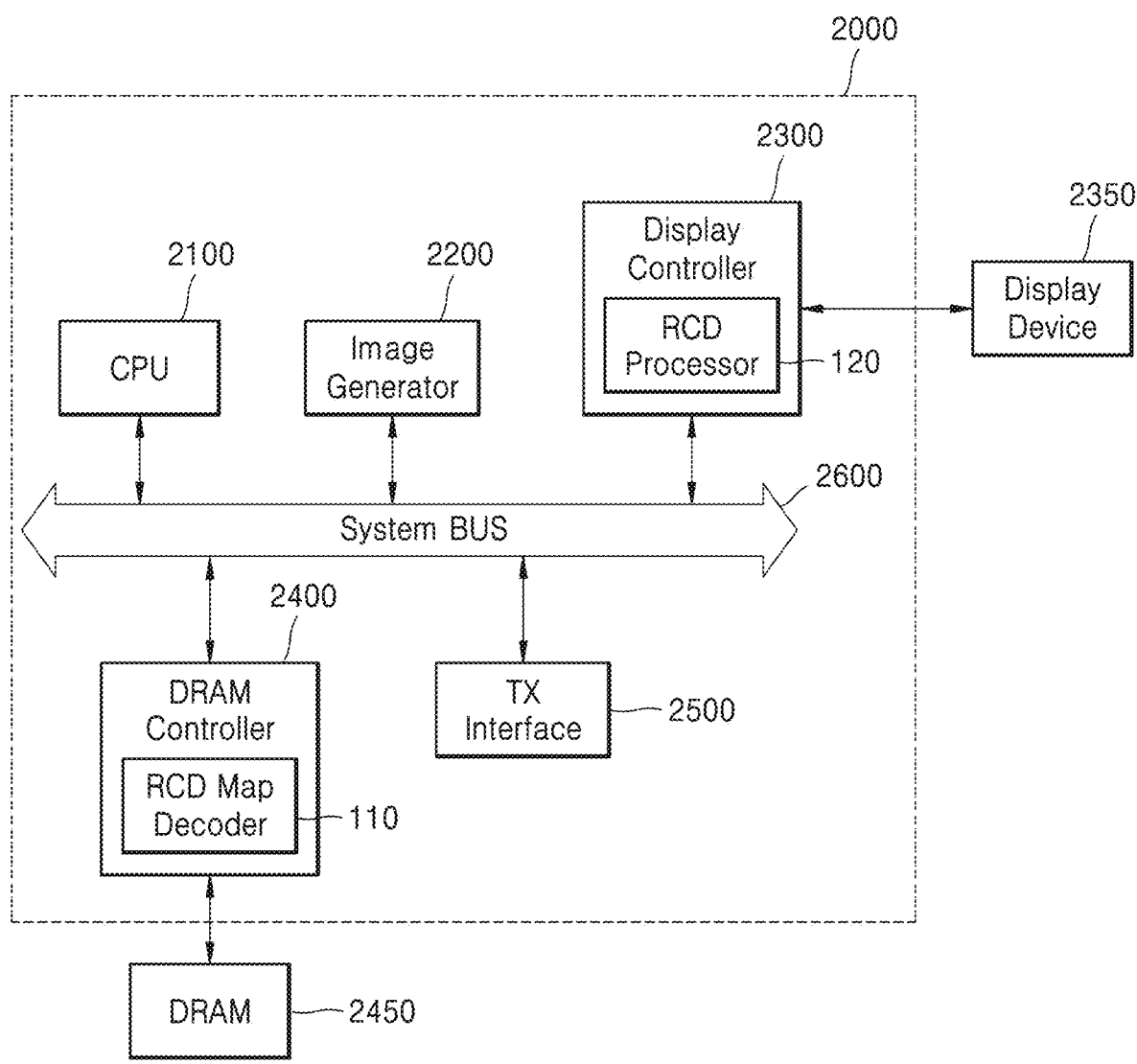
FIG. 16 is a block diagram illustrating an application processor according to an example embodiment.

FIG. 16 is a block diagram illustrating an AP according to an example embodiment.

Referring to FIG. 16, an AP 2000 may include a CPU 2100, an image generator 2200, a display controller 2300, a DRAM controller 2400, a transmission (TX) interface 2500, and a system bus 2600. The CPU 2100, the image generator 2200, the display controller 2300, the DRAM controller 2400, and the TX interface 2500 of the AP 2000 may communicate with each other through the system bus 2600.

The CPU 2100 may control all operations of the AP 2000. The CPU 2100 may control operations of the image generator 2200, the display controller 2300, the DRAM controller 2400, the TX interface 2500, and the system bus 2600.

In some example embodiments, the CPU 2100 may be implemented as a multi-core. The multi-core is a computing component including two or more independent cores.

The image generator 2200 may perform operations related to graphics processing. In some example embodiments, the image generator 2200 may generate image data corresponding to an image to be displayed on the display device 2350. The image generator 2200 may generate rectangular image data.

According to an example embodiment, the image generator 2200 may include a GPU, a graphics accelerator, a display processor (DSP), and so on. The image generator 2200 may be implemented in software or hardware.

The display controller 2300 may output image data or updated image data to the display device 2350. The display controller 2300 may include an RCD processor 120, and the RCD processor 120 may perform RCD processing on the image data based on alpha values indicated by the RCD map as described above. The display controller 2300 may provide RCD-processed image data, that is, RCD-alpha-blended image data to the display device 2350. The display device 2350 may include the display panel 320 in FIG. 1 that includes round corners and/or a pinhole region, and an image may be displayed on the display panel 320 based on RCD-processed image data.

The DRAM controller 2400 may provide an interface between the AP 2000 and the DRAM 2450. The DRAM 2450 may store various data used or generated by the AP 2000. For example, the DRAM 2450 may store image data and an RCD map and provide the image data and the RCD map to the display controller 2300. In addition, the DRAM 2450 may be replaced with a volatile memory, such as SRAM, thyristor RAM (T-RAM), zero capacitor RAM (Z-RAM), or twin transistor RAM (TTRAM), or a nonvolatile memory, such as electrically erasable programmable read-only memory (EEPROM), flash memory, magnetic RAM (MRAM), phase change RAM (PRAM), or resistive RAM (ReRAM).

The DRAM controller 2400 may include the RCD map decoder 110. As described above, the RCD map decoder 110 may read an RCD map from the DRAM 2450 and provide the RCD map to the RCD processor 120. As described above, the RCD map decoder 110 may provide alpha values from the RCD map to the RCD processor 120 in units of pixels in synchronization with image data provided to the RCD processor 120. In some example embodiments, the RCD map may be compressed and stored in the DRAM 2450, the RCD map decoder 110 may decompress the compressed RCD map read from the DRAM 2450 and provide alpha values from the decompressed RCD map to the RCD processor 120.

The TX interface 2500 may communicate with an external device according to protocols of various interfaces and may receive data from the external device or transmit command signals and data to the external device. For example, an interfaces that is applied to the TX interface 2500 may include any one of an RGB interface, a CPU interface, a serial interface, a mobile display digital interface (MDDI), an inter-integrated circuit (I2C) interface, a serial peripheral interface (SPI), and a microcontroller (MCU) interface, a MIPI, a DisplayPort (DP) interface, an embedded DisplayPort (eDP) interface, a Universal Serial Bus (USB) interface, and a high-definition multimedia interface (HDMI). In addition, various interface methods may be applied as an interface method of the TX interface 2500.

While aspects of example embodiments have been shown and described, it will be understood that various changes in form and details may be made therein without departing from the spirit and scope of the following claims.

What is claimed is:
1. An image processing device comprising:
an image quality enhancement circuit configured to generate second image data indicating a plurality of pixel values corresponding to a quadrangular shape by performing image quality enhancement processing on first image data;
a map decoder configured to read a map, which comprises a plurality of pixel adjustment values for adjusting brightness of a first region of the second image data corresponding to a curved edge of a display panel, from a memory and provide alpha values indicated by the map;

a processing circuit configured to generate third image data by adjusting the brightness of the first region by applying the alpha values to the second image data; and a transmission circuit configured to output the third image data to a display driving integrated circuit.

2. The image processing device of claim 1, wherein the map decoder is further configured to read a compressed stream of the map stored in the memory, reconstruct the map by decompressing the compressed stream, and transmit the reconstructed map to the processing circuit.

3. The image processing device of claim 2, wherein a prefix of the compressed stream of the map comprises information indicating attributes of the plurality of pixel adjustment values and M-bit data representing a number of the plurality of pixel adjustment values, and wherein a suffix of the compressed stream of the map comprises information indicating the plurality of pixel adjustment values.

4. The image processing device of claim 2, wherein the map decoder comprises an internal memory configured to store the reconstructed map.

5. The image processing device of claim 1, wherein the map decoder is further configured to transmit the plurality of pixel adjustment values respectively corresponding to the plurality of pixel values to the processing circuit in synchronization with the plurality of pixel values of the second image data transmitted to the processing circuit.

6. The image processing device of claim 1, wherein the plurality of pixel adjustment values comprise a first pixel adjustment value, a second pixel adjustment value, and a third pixel adjustment value respectively corresponding to a red sub-pixel value, a green sub-pixel value, and a blue sub-pixel value among the plurality of pixel values.

7. The image processing device of claim 1, wherein the map decoder is further configured to transform the map by performing at least one of rotation and left and right mirroring on the map and transmit pixel adjustment values of the transformed map to the processing circuit.

8. The image processing device of claim 1, wherein the map decoder is further configured to transmit, to the processing circuit, pixel adjustment values corresponding to a region of interest of the display panel among the plurality of pixel adjustment values of the map, and wherein the region of interest corresponds to a round corner of the display panel.

9. The image processing device of claim 1, wherein the curved edge corresponds to a round corner of the display panel, wherein the second image data comprises a second region corresponding to a normal display region inside the round corner, and a third region corresponding to a non-display region outside the round corner, the first region corresponding to a boundary between the second region and the third region, wherein the map comprises a first pixel adjustment value corresponding to the first region, a second pixel adjustment value corresponding to the second region, and a third pixel adjustment value corresponding to the third region, and wherein the first pixel adjustment value is variable, and the second pixel adjustment value and the third pixel adjustment value are fixed values.

10. The image processing device of claim 1, further comprising a compression circuit configured to compress the third image data and provide the compressed third image data to the transmission circuit.

11. An operating method of an image processing device, the operating method comprising:

generating second image data indicating a plurality of pixel values by performing image quality enhancement processing on first image data that is received;

reading a map comprising a plurality of pixel adjustment values for adjusting brightness of a first region of the second image data corresponding to a curved edge of a display panel from an external memory by using a map decoder;

performing processing on the second image data based on the map to generate third image data using a processing circuit, wherein the processing comprises adjusting the brightness of the first region of the second image data; and transmitting the third image data to a display driving integrated circuit.

12. The operating method of claim 11, wherein the reading the map comprises:

reading a compressed stream of the map stored in the external memory;

reconstructing the map by decompressing the compressed stream; and transmitting the reconstructed map to the processing circuit.

13. The operating method of claim 11, wherein the reading the map comprises:

reading region of interest (ROI) pixel adjustment values corresponding to a ROI of the second image data among the plurality of pixel adjustment values of the map stored in the external memory; and transmitting the ROI pixel adjustment values to the processing circuit.

14. The operating method of claim 11, wherein the performing comprises:

sequentially receiving the plurality of pixel values of the second image data;

sequentially receiving the plurality of pixel adjustment values of the map in synchronization with the plurality of pixel values; and applying, in real time, a corresponding pixel adjustment value among the plurality of pixel adjustment values to a received pixel value among the plurality of pixel values.

15. The operating method of claim 11, further comprising:

receiving a plurality of pieces of layer data respectively representing a plurality of images;

generating the first image data by blending the plurality of pieces of layer data; and compressing the third image data.

16. A display system comprising:

a display panel;

a display driving integrated circuit configured to drive the display panel; and an application processor configured to generate second image data by adjusting brightness of a first region of first image data corresponding to a curved edge of the display panel by performing processing on the first image data based on a map comprising a plurality of pixel adjustment values respectively corresponding to a plurality of pixels of the display panel, and provide the second image data to the display driving integrated circuit.

17. The display system of claim 16, wherein the application processor comprises:
- a memory storing one or more instructions; and
- at least one processor configured to execute the one or more instructions stored in the memory to:
- generate the first image data,
- perform image quality enhancement processing on the first image data to generate a plurality of pixel values,
- read the map from an external memory, and
- generate the second image data by adjusting the brightness of the first region by applying the plurality of pixel adjustment values of the map to the plurality of pixel values.

18. The display system of claim 17, wherein the at least one processor is further configured to execute the one or more instructions stored in the memory to:
- read a compressed stream of the map stored in the external memory,
- reconstruct the map by decompressing the compressed stream, and
- perform the processing based on the reconstructed map.

19. The display system of claim 17, wherein the at least one processor is further configured to execute the one or more instructions stored in the memory to read pixel adjustment values corresponding to the first region among the plurality of pixel adjustment values of the map.

20. The display system of claim 16, wherein the curved edge corresponds to a round corner of the display panel, wherein the map comprises first pixel adjustment values corresponding to the first region, second pixel adjustment values corresponding to a display region inside the round corner of the display panel, and third pixel adjustment values corresponding to a non-display region outside the round corner of the display panel, and wherein the first pixel adjustment values are variable, and the second pixel adjustment values and the third pixel adjustment values are fixed values.

* * * * *